July 29, 1941. A. H. T. THEORELL 2,251,082
METHOD AND MEANS FOR THE PURIFICATION AND SEPARATION OF
COLLOIDS FROM CONTAMINATING MATTER
Filed March 19, 1937
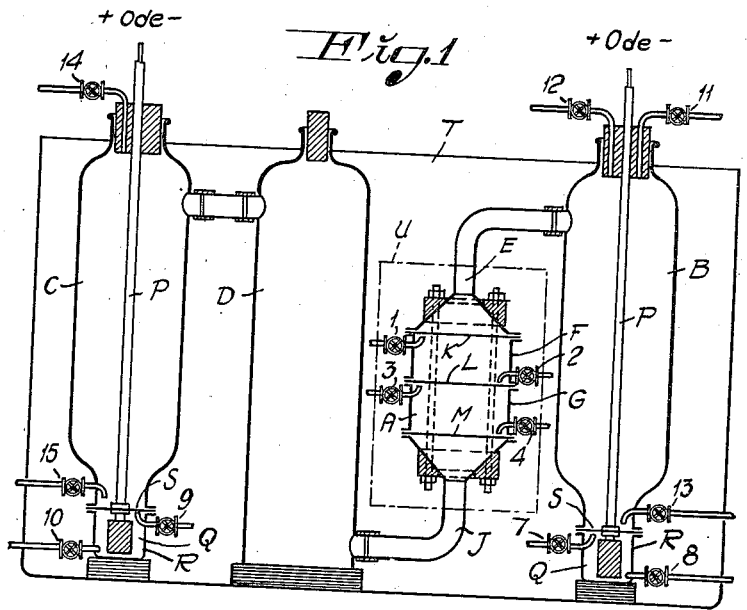
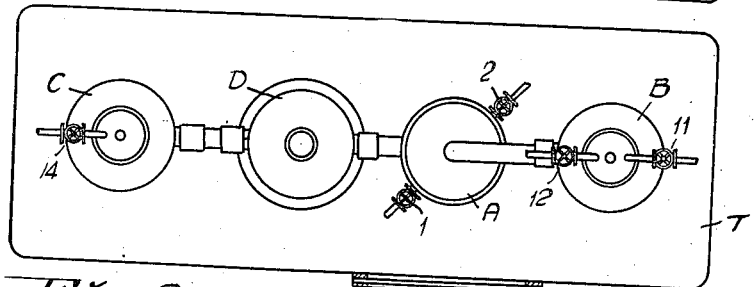
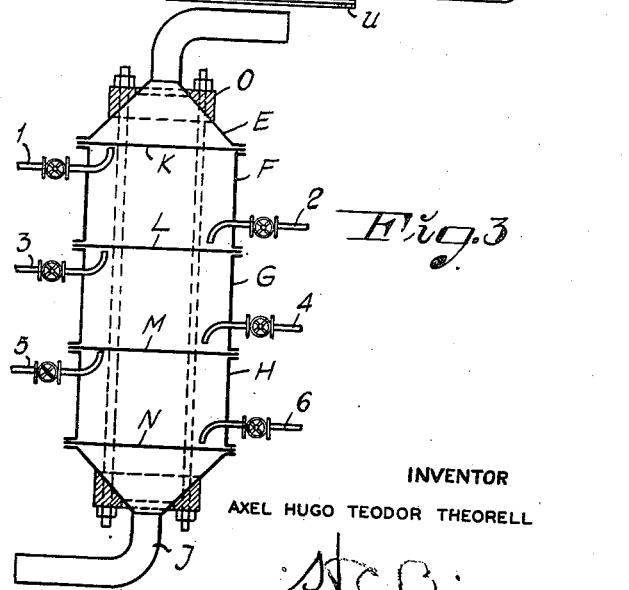
INVENTOR
AXEL HUGO TEODOR THEORELL Patented July 29, 1941

2,251,082

UNITED STATES PATENT OFFICE 2,251,082

METHOD AND MEANS FOR THE PURIFICATION AND SEPARATION OF COLLOIDS FROM CONTAMINATING MATTER

Axel Hugo Teodor Theorell, Stockholm, Sweden

Application March 19, 1937, Serial No. 131,907
In Germany July 27, 1934

12 Claims. (Cl. 204—180)

The mobility and the charge of colloidal particles may be determined with the aid of the known cataphoretic methods. These methods are distinguished by the feature that a suitable electric charge is imparted to a colloid at a definite hydrogen ion concentration, which results in that the colloid migrates at a certain velocity either to the positive or to the negative side.

Now, it has been found that these cataphoretic methods may also be applied for the purpose of purifying colloids or of separating the same in a simple, cheap and convenient manner from contaminating matter, such as albumens, ferments, enzymes, hormones, toxines and anti bodies, high molecular dye stuffs and other high molecular compounds and the like. In the known cataphoretic investigating methods, U-shaped apparatus are employed to carry the cataphoresis into effect, which apparatus, however, are not suitable for the purification of colloids on a large scale since they suffer from a number of disadvantages. On account of the great development of heat at the passage of the current, the diameter of these apparatus must be kept very small (1–2 cm.). For this reason, it is not feasible to apply any high tensions, which results in that the migration of the colloidal particles takes place very slowly and the out-turn is very small.

These disadvantages are avoided, however, if in accordance with the method according to the present invention the colloid mixtures are subjected to cataphoresis in a cataphoretic cell containing one or more diaphragms permitting the passage of the colloid, and one or more diaphragms not permitting the passage of the colloid, at a pH-value remaining substantially constant and corresponding to an optimum for the separation of the components of the mixture, the said pH-value being maintained by a buffer solution or other electrolyte solution of the pH-value in question separating the cataphoretic cell from the electrodes.

The invention also comprises a means for carrying said method into effect, such means consisting of a cataphoretic cell divided into a number of parts or chambers by means of diaphragms of varying permeability toward the colloid, said cell being through the agency of an intermediate vessel in communication with electrode vessels containing the current-carrying liquid, and in which the electrode plates connected to the source of current are arranged. According to one form of embodiment, the arrangement comprises a cataphoretic cell divided into two chambers which are separated from each other by a diaphragm which is permeable toward the colloid, and which are separated from the intermediate vessels by means of diaphragms that are impermeable to the colloid.

The accompanying drawing illustrates an apparatus according to the principle of the present invention. Fig. 1 is a diagrammatic section of the apparatus. Fig. 2 is a diagrammatic plan view. Fig. 3 represents a section of the cell of the type in question provided with four diaphragms.

In the figures of the drawing, A designates the cataphoretic cell. B and C are the two electrode vessels, and D is an intermediate vessel connected to the cell A and to the electrode vessel C, the vessel D serving to keep the electrode liquid in the electrode plate chamber R away from the cell A. The cataphoretic cell A comprises an upper portion E which is in open communication with the electrode vessel B, a plurality of intermediate portions F, G and H fitted with inlets and outlets and provided with inlet and outlet cocks 1, 2, 3, 4, 5 and 6, and also comprises a lower portion I which is in open communication with the intermediate vessel D. Connected between the various parts of the cataphoretic cell A are the diaphragms K, L, M and N consisting of different materials, so that the cell is divided into one or more chambers in which the cataphoresis of the colloids takes places. The various parts of the cataphoretic cell A are kept together by means of the frame O. Preferably, the vessels B, C, D should be kept closed. The plugs are provided with cocks to render possible the exit of the air and the entrance of the buffer solution, and furthermore, the plugs have the electrode leads extended therethrough, said leads consisting of silver wire and being surrounded by a protective tubing P of hard rubber. The electrodes proper consist of silver plates Q wound in spiral shape, said silver plates having a large surface and being connected with a source of current by means of the silver wires. Prior to being used, the silver plates Q are covered in known manner by a layer of silver chloride. They are located in the electrode plate chambers R which are connected with the electrode vessels B and C in any suitable manner, the diaphragms S separating the saturated potassium chloride solution in the electrode plate chambers R from the buffer solution in the electrode chambers B and C. The said potassium chloride solution is supplied to and drawn off the electrode plate chambers R by means of the inlet and outlet cocks 7, 8, 9 and 10. The cocks 11, 12, 13, 14, 15 are used for supplying and removing the buffer solution and for letting off the air. The whole apparatus is preferably placed into a thermostat T which is provided with a window U of suitable material for the observation of the processes in the cataphoretic cell A.

The mode of operation of the apparatus hereinabove described and illustrated in the drawing, and serving to carry the method according to the present invention into effect, will be explained more fully in the following with reference to a few examples.

It is known that the electric charges of colloids are in a certain way dependent on the pH-value of the solutions thereof, that is to say in a manner such that some of them may be more or less negatively charged and some of them more or less positively charged at all pH-values, whereas the colloids that are of an amphoteric nature may appear either positively charged (at pH-values beneath the isoelectric point) or negatively charged (at pH-values above the isoelectric point). On account of these conditions it will be possible in a solution of a plurality of different colloids to find an optimum pH-value for the separation of two or more components.

Thus, in the Example 1 hereinbelow, the pH-value 4.1 was selected because the yellow oxidation enzyme, which is isoelectric at a pH-value $=5.2$, is positively charged at the first mentioned pH-value$=4.1$, while the other colloids are negatively charged or uncharged.

EXAMPLE 1

*Purification of the yellow oxidation enzyme*

25 g. of the preparation preliminarily purified by chloroform according to Warburg and Christian (Biochem. Zeitschr. 1933, volume 266, page 380) are dissolved in 400 cubic centimeters of 0.02 n acetic acid and are introduced into the chamber G. As a current-carrying liquid filling the whole apparatus save for the electrode plate chambers R an acetate buffer solution of a pH-value$=4.1$ and of low conductivity is used. ($\kappa=0.3-0.4\times10^{-3}$). The electrode plate chambers R are filled with a saturated potassium chloride solution. Then a tension of about 2000 volts direct current is applied to the electrodes, so that the positively charged ferment molecules migrate into the other chamber F through the middle diaphragm L permeable to colloids and consisting of hardened filtering paper. The diaphragms K and M, which consist of genuine parchment paper, are impermeable to the ferment. The purification procedure will be terminated in a period of about 10 hours. The outturn amounts almost to 100%. By this method a product is obtainable which is 30 times purer than the starting material. The contaminations then removed, which substantially consist of polysaccharides and albumens, cannot be separated in any other way without changing the ferment. From the product thus obtained, the ferment is readily obtainable in a crystallized form by repeated precipitation with a neutral salt at a pH-value$=5.2$ and redissolution in a buffer solution of a pH-value$=5.2$.

EXAMPLE 2

*Purification of intermediate respiratory enzymes from blood corpuscles*

The method is carried into effect in the same manner as above described in Example 1, but the cataphoresis is effected at a pH-value of about 6.5 with the use of a phosphate buffer solution.

EXAMPLE 3

*Purification of intermediate respiratory enzymes from yeast*

The purification is carried out in the same manner as was described in Example 1, but with the employment of a pH-value of 5.5 or still lower, an acetate buffer solution being used as current-carrying liquid.

EXAMPLE 4

*Separation of serum albumen and serum globulin*

This separation cannot be effected satisfactorily with the salt precipitation methods as hitherto practised, but may be successfully carried out according to the present method, if the cataphoresis is effected at a pH-value of about 5.0.

If positively as well as negatively charged colloidal particles of such a solution are available, a cell of the type illustrated in Fig. 3, which contains three chambers, is used to advantage. The solution intended for purification is then introduced into the central chamber. The positively charged particles will then migrate through the intermediate diaphragms consisting, for instance, of filtering paper, into the one of the outer chambers, whereas the negatively charged particles migrate into the opposite outer chamber.

In place of filtering paper and parchment paper it is also possible to use other materials. For example, hardened filtering paper is used for the middle diaphragm for the migration of positively charged particles therethrough, while either hardened filtering paper or a sintered glass filtering plate is used for the migration of negatively charged particles. For the outer diaphragms different materials may be used in dependence on the starting material employed, such as Cellophane, collodion impregnated with various albumens, genuine parchment paper, genuine parchment, chromium gelatine and the like.

What I claim is:

1. A method of purification of colloids to separate the same from contaminating matter which comprises placing a solution containing said substances in the cataphoretic compartment of a cell having at least one membrane permeable to said colloid, interposing a buffer salt solution between said compartment and the electrodes of said cell, the pH of said solution corresponding to that necessary to cause selective migration of said colloid, subjecting said colloid containing solution to the electric current to cause migration of said colloid through said permeable membrane, and maintaining the pH substantially constant during said treatment.

2. A method of purification of colloids to separate the same from contaminating matter which comprises placing a solution containing said substances in the cataphoretic compartment of a cell having at least one membrane permeable to said colloid, interposing a buffer salt solution between said compartment and the electrodes of said cell, the pH of said solution corresponding to that necessary to cause selective migration of said colloid, subjecting said colloid containing solution to the electric current to cause migration of said colloid through said permeable membrane, maintaining the pH substantially constant during said treatment, and then removing the solution containing the purified colloid.

3. A method of purification of colloids to separate the same from contaminating matter which comprises placing a solution containing the yellow oxidation enzyme with contaminating matter in the cataphoretic compartment of a cell having at least one membrane permeable to said colloid, interposing a buffer salt solution between said compartment and the electrodes of said cell, the pH of said solution corresponding to that necessary to cause selective migration of said yellow oxidation enzyme, subjecting said yellow oxidation enzyme containing solution to the electric current to cause migration of said yellow oxidation enzyme through said permeable membrane, and maintaining the pH substantially constant during said treatment.

4. A method of purification of colloids to separate the same from contaminating matter which comprises placing a solution containing the yellow oxidation enzyme with contaminating matter in the cataphoretic compartment of a cell having at least one membrane permeable to said colloid, interposing a buffer salt solution between said compartment and the electrodes of said cell, the pH of said solution corresponding to that necessary to cause selective migration of said yellow oxidation enzyme, subjecting said yellow oxidation enzyme containing solution to the electric current to cause migration of said yellow oxidation enzyme through said permeable membrane, and maintaining the pH substantially constant during said treatment at a value of about 4.1.

5. A method of purification of colloids to separate the same from contaminating matter which comprises placing a solution containing the intermediate respiratory enzymes with contaminating matter in the cataphoretic compartment of a cell having at least one membrane permeable to said colloid, interposing a buffer salt solution between said compartment and the electrodes of said cell, the pH of said solution corresponding to that necessary to cause selective migration of said intermediate respiratory enzymes, subjecting said intermediate respiratory enzymes containing solution to the electric current to cause migration of said intermediate respiratory enzymes through said permeable membrane, and maintaining the pH substantially constant during said treatment.

6. A method of purification of colloids to separate the same from contaminating matter which comprises placing a solution containing the intermediate respiratory enzymes with contaminating matter in the cataphoretic compartment of a cell having at least one membrane permeable to said colloid, interposing a buffer salt solution between said compartment and the electrodes of said cell, the pH of said solution corresponding to that necessary to cause selective migration of said intermediate respiratory enzymes, subjecting said intermediate respiratory enzymes containing solution to the electric current to cause migration of said intermediate respiratory enzymes through said permeable membrane, and maintaining the pH substantially constant during said treatment at a value of about 5.5–6.5.

7. A method of purification of colloids to separate the same from contaminating matter which comprises placing a solution containing serum albumen with serum globulin in the cataphoretic compartment of a cell having at least one membrane permeable to said colloid, interposing a buffer salt solution between said compartment and the electrodes of said cell, the pH of said solution corresponding to that necessary to cause selective migration of said serum albumen, subjecting said serum albumen containing solution to the electric current to cause migration of said serum albumen through said permeable membrane, and maintaining the pH substantially constant during said treatment.

8. A method of purification of colloids to separate the same from contaminating matter which comprises placing a solution containing serum albumen with serum globulin in the cataphoretic compartment of a cell having at least one membrane permeable to said colloid, interposing a buffer salt solution between said compartment and the electrodes of said cell, the pH of said solution corresponding to that necessary to cause selective migration of said serum albumen, subjecting said serum albumen containing solution to the electric current to cause migration of said serum albumen through said permeable membrane, and maintaining the pH substantially constant during said treatment at a value of about 5.0.

9. An apparatus for cataphoresis comprising a cataphoretic cell, electrode chambers communicating therewith, a colloid permeable membrane in said cell, a colloid impermeable membrane interposed between said permeable membrane and each of said electrode chambers, one of the compartments so formed adapted to contain a solution of a substance to be purified, and a buffer salt solution in said electrode chambers.

10. An apparatus for cataphoresis comprising a cataphoretic cell, electrode chambers communicating therewith, a colloid permeable paper membrane in said cell, a colloid impermeable parchment membrane interposed between said permeable membrane and each of said electrode chambers, one of the compartments so formed adapted to contain a solution of a substance to be purified, and a buffer salt solution in said electrode chambers.

11. An apparatus for cataphoresis comprising a cataphoretic cell, electrode chambers communicating therewith, a colloid permeable membrane in said cell, a colloid impermeable membrane interposed between said permeable membrane and each of said electrode chambers, one of the compartments so formed adapted to contain a solution of a substance to be purified, a buffer salt solution in said electrode chambers and means for allowing a flow of solution through at least one of said compartments.

12. An apparatus for cataphoresis comprising a cataphoretic cell, electrode chambers communicating therewith, a colloid permeable membrane in said cell, a plurality of membranes having lesser permeability for colloids interposed between said permeable membrane and each of said electrode chambers, one of the compartments so formed adapted to contain a solution of a substance to be purified, and a buffer salt solution in said electrode chambers.

AXEL HUGO TEODOR THEORELL.